(12) United States Patent
Blocher

(10) Patent No.: US 9,365,055 B2
(45) Date of Patent: Jun. 14, 2016

(54) LABEL AND/OR RECEIPT PRINTER

(71) Applicant: BIZERBA GMBH & CO. KG, Balingen (DE)

(72) Inventor: Harald Blocher, Shoemberg (DE)

(73) Assignee: BIZERBA GMBH & CO. KG, Balingen (DE)

( * ) Notice: Subject to any disclaimer, the term of this patent is extended or adjusted under 35 U.S.C. 154(b) by 0 days.

(21) Appl. No.: 14/646,867

(22) PCT Filed: Nov. 14, 2013

(86) PCT No.: PCT/EP2013/073861
§ 371 (c)(1),
(2) Date: May 22, 2015

(87) PCT Pub. No.: WO2014/082866
PCT Pub. Date: Jun. 5, 2014

(65) Prior Publication Data
US 2015/0298468 A1    Oct. 22, 2015

(30) Foreign Application Priority Data

Nov. 30, 2012   (DE) .......................... 10 2012 221 961

(51) Int. Cl.
*B41J 2/325*   (2006.01)
*B41J 11/00*   (2006.01)
(Continued)

(52) U.S. Cl.
CPC .............. *B41J 11/007* (2013.01); *B41J 3/4075* (2013.01); *B41J 15/042* (2013.01); *B41J 29/02* (2013.01);
(Continued)

(58) Field of Classification Search
USPC ......... 347/101–106, 215, 217, 212, 213, 171, 347/172, 175
See application file for complete search history.

(56) References Cited

U.S. PATENT DOCUMENTS 5,030,968 A   7/1991  Benson et al.
6,088,049 A   7/2000  Austin et al.
(Continued)

FOREIGN PATENT DOCUMENTS

| DE | 102 07 332 A1 | 9/2003 |
|----|---------------|--------|
| EP | 0 263 319 A2  | 4/1988 |
| EP | 0 392 643 A2  | 10/1990 |
| JP | H06 11382 A   | 1/1994 |

OTHER PUBLICATIONS

International Search Report and Written Opinion mailed Feb. 12, 2014, from International Application No. PCT/EP2013/073861 (8 pages).

(Continued)

*Primary Examiner* — Kristal Feggins
(74) *Attorney, Agent, or Firm* — Kilpatrick Townsend & Stockton LLP

(57) ABSTRACT

The invention relates to a printer (11) for printing on printing media in the form of label and/or receipt rolls (23, 43), comprising a print head (27) and a top cover (17), which can be folded between a closed position and an open position and which provides access to an accommodating chamber (15) for a label or receipt roll in the open position. The printer (11) also comprises a drive roller (29) that can be driven by a drive of the printer for transporting the particular printing medium and a front cover (21), which can be folded between a closed position and an open position and which provides access to an additional accommodating chamber (19) for a receipt roll (29) in the open position, wherein the drive roller is provided on the front cover (21).

15 Claims, 4 Drawing Sheets

Figure 1:
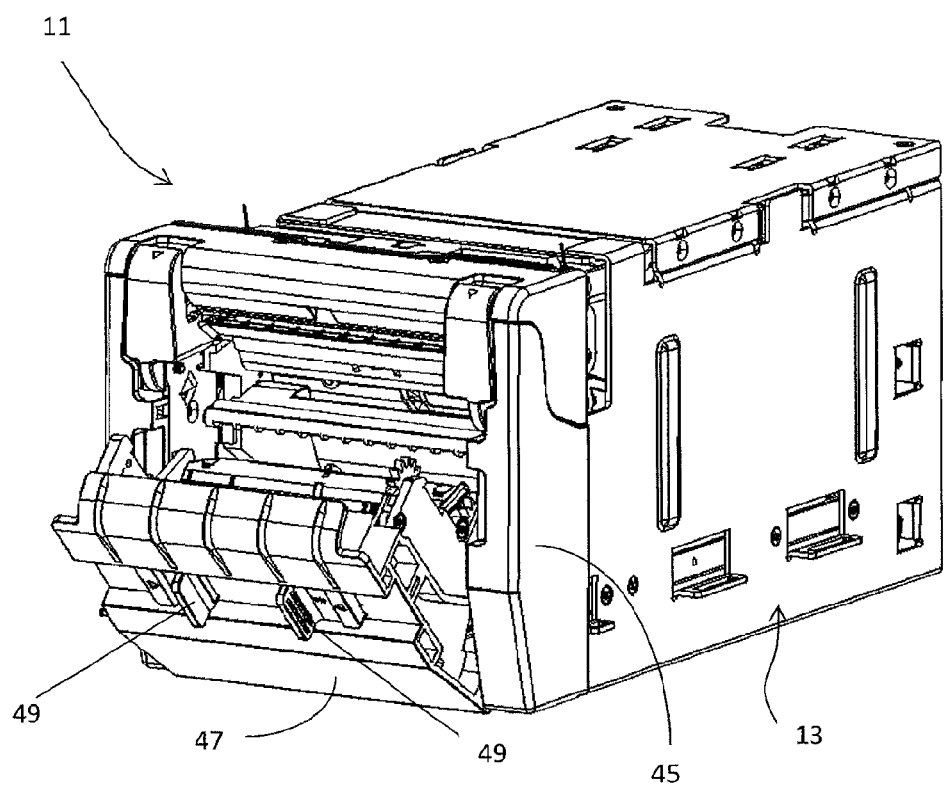

(51) Int. Cl.
*B41J 15/04* (2006.01)
*B41J 29/02* (2006.01)
*B41J 3/407* (2006.01)
*B41J 29/13* (2006.01)
*G07F 17/42* (2006.01)
*G07G 5/00* (2006.01)
*G01G 19/414* (2006.01)
*G07B 5/02* (2006.01)

(52) U.S. Cl.
CPC ............... *B41J 29/13* (2013.01); *G07F 17/42* (2013.01); *G07G 5/00* (2013.01); *G01G 19/4144* (2013.01); *G07B 5/02* (2013.01)

(56) References Cited

U.S. PATENT DOCUMENTS

| | | |
|---|---|---|
| 6,607,316 B1 | 8/2003 | Petteruti et al. |
| 2005/0271449 A1 | 12/2005 | Hirte et al. |
| 2007/0009305 A1 | 1/2007 | Sakaino et al. |
| 2011/0025809 A1 | 2/2011 | Sekino et al. |
| 2011/0315076 A1 | 12/2011 | Watanabe |

OTHER PUBLICATIONS

International Preliminary Report on Patentability mailed Jun. 11, 2015, from International Application No. PCT/EP2013/073861 (12 pages).

LABEL AND/OR RECEIPT PRINTER

This application is a U.S. National Phase of International Application No. PCT/EP2013/073861, filed Nov. 14, 2013, which claims priority to German Patent Application No. 10 2012 221 961.7, filed Nov. 30, 2012, the disclosures of which are incorporated by reference herein.

The present invention relates to a printer, in particular to a thermal printer, in particular for store scales, for the printing of printed media in the form of label rolls and/or receipt rolls, having a printhead and an upper-side cover which can be pivoted between a closed position and an open position and which releases access to a reception space for a label roll or receipt roll in the open position.

Such a printer, which is also called a clamshell printer due to its pivotable upper-side cover, is known, for example, from the document U.S. Pat. No. 6,088,049. The use of this printer is, however, not very flexible.

It is the underlying object of the invention to provide a printer which can print a plurality of different printed media and which is in this respect comfortable to operate without error.

This object is satisfied by a printer of the initially named kind, and in particular by a drive roller, which can be driven by a drive of the printer for transporting the respective printed medium and by a front-side cover which is pivotable between a closed position and an open position and which releases access to a further reception space for a receipt roll in the open position, with the drive roller being provided at the front-side cover.

In accordance with the invention, two covers are provided via which two mutually separate reception spaces for printed media are accessible. For example, a label roll, in particular a carrier tape label roll or a linerless label roll, or a receipt roll, can be inserted into the reception space associated with the upper-side cover—also called the first reception space in the following—and a further receipt roll, which e.g. has a smaller width with respect to the label roll insertable into the first reception space, can be inserted into the further reception space—also called the second reception space in the following—associated with the frontal-side or front-side cover and arranged behind the first reception space, in particular viewed in the dispensing direction of the labels or receipts. The second reception space is in particular additionally configured to receive a carrier tape roll for winding a carrier tape of a carrier tape label roll inserted into the first reception space.

Since the drive roller is provided at the front-side cover, the driver roller can be pivoted together with the front-side cover. When the front-side cover is pivoted closed, a correspondingly sufficiently unwound roll start of the printed medium inserted into the second reception space can then be clamped by the drive roller and it can hereby be ensured in a simple manner that printed medium inserted into the second reception space is gripped by the drive roller with frictional engagement. A laborious threading of the roll start into a feed opening for the drive roller is dispensed with.

In accordance with an embodiment of the invention, the front-side cover comprises an outer frame with the driver roll and an inner flap which can be pivoted relative to the outer frame between a closed position and an open position and which releases access to the further reception space for a carrier tape roll, as described above, in the open position. It is therefore not necessary for the insertion of a carrier tape roll into the second reception space to pivot open the total front-side cover, but it is rather sufficient for this purpose only to open the inner flap. The inner flap can, for example, be actuated via a latch such as described in the following and via actuation means such as described in the following.

A media receiver for a receipt roll is preferably provided which can be inserted into the further reception space with an open front-side cover. The media receiver can preferably not be inserted through the inner flap into the further reception space. The media receiver for the receipt roll can in particular be a reception shell. The reception roll can then be simply placed into the reception shell.

In accordance with a further embodiment of the invention, blocking means are provided which block the opening of the inner flap with an inserted media receiver. It can hereby be prevented that an operator accidentally attempts to insert a carrier tape roll into the further reception space although there is already a receipt roll or a media receiver for a receipt roll therein.

A latch can be provided which is preloaded into a position latching the opening of the inner flap and which can be moved by means of actuation means into an unlatching position allowing the opening of the inner flap, with the actuation of the latch being blocked with an inserted media receiver. The blocking means in this case act directly on the latch effecting the opening and closing of the inner flap.

For example, the latch can for this purpose have two pushers which are each movable in a lateral direction, which are laterally spaced apart from one another, which are preloaded oppositely and respectively laterally and which engage in the latching position with outer ends in lateral sides of the outer frame, with the media receiver having a blockage section for each of the two pushers, with the blockage sections engaging into a respective trajectory of the respective pusher with a media receiver inserted into the further reception space and respectively acting as an abutment for an inner end of the respective pusher blocking the movement of the respective pusher into the unlatching position.

The carrier tape roll inserted into the further reception space is preferably in drive-effective connection with the aforesaid drive of the printer to drive the drive roller, with a slip clutch in particular being connected upstream of the carrier tape roll. It can hereby be ensured that a carrier tape of a carrier tape label roll inserted into the first reception space can be wound onto the carrier tape roll under tensile stress.

A roll holder, which can be inserted into the reception space with an open upper-side cover, can be provided for carrier tape label rolls and linerless label rolls. Alternatively or additionally, a pivotable support which can be pivoted into a reception position can be provided for a receipt roll in the reception space. A problem-free unwinding of the label rolls or of the receipt rolls can thereby be ensured.

Self-adhesive carrier tape-less label rolls are in particular understood by the term "linerless label rolls". Such label rolls can, however, in accordance with a different language usage, also be called "linerless receipt rolls". In contrast to this, a "receipt roll" is then to be understood as a conventional receipt roller manufactured without an adhesive layer.

It is preferred for the drive roller to be configured as a print roll for the printhead, i.e. the printhead is arranged directly above the drive roller and the printed medium is guided between the printhead and the print roll. When the printhead is provided at the upper-side cover, the printhead can be pivoted open with the upper-side cover. When the upper-side cover is pivoted closed, a correspondingly sufficiently unwound roll start of the printed medium inserted into the first reception space can then be clamped between the printhead and the drive roller and it can hereby be ensured in a simple manner that the printed medium inserted into the second reception space is gripped by the drive roller with frictional engagement. The printhead is in particular a thermal printhead.

The printer can provide at least three, in particular four, mutually different paper guides or transport paths for printed media. A paper guide comprises a carrier tape label roll which is arranged on a roll holder, which is inserted into the first reception space and which is unwound via the drive roller, with an associated carrier tape roll for the carrier tape being inserted into the second reception state. Another paper guide comprises a linerless label roll which is arranged on a roll holder, which is inserted into the first receiving space and which is unwound via the drive roller with which, however, due to a lack of carrier tape, no carrier tape roll is associated. Another paper guide comprises a receipt roll which is arranged on a pivot support provided in the first reception space and which is unwound via the drive roller. A further paper guide comprises a receipt roll which is arranged in a media receiver which is provided in the second reception space and which is unwound via the drive roller. A carrier tape roll is likewise not associated with the receipt rolls.

The same drive roller, the same printhead and/or the same dispensing opening are in particular associated with the mutually different paper guides, i.e. the printer only has one single drive roller common to all paper guides, only one single printhead common to all paper guides and/or only one single dispensing opening which is common to all paper guides and by which the different printed media are dispensed—independently of the respective paper guide—downstream of the printhead.

A common roller holder can be provided for carrier tape label rolls and linerless label rolls. Two mutually different media receivers can be provided for receipt rolls, in particular for receipt rolls of different widths.

The invention furthermore relates to store scales having a printer such as described above.

Advantageous embodiments of the invention are set forth in the dependent claims, in the description and in the drawing.

A non-restricting embodiment of the invention is represented in the drawing and will be described in the following.

Figure 2:
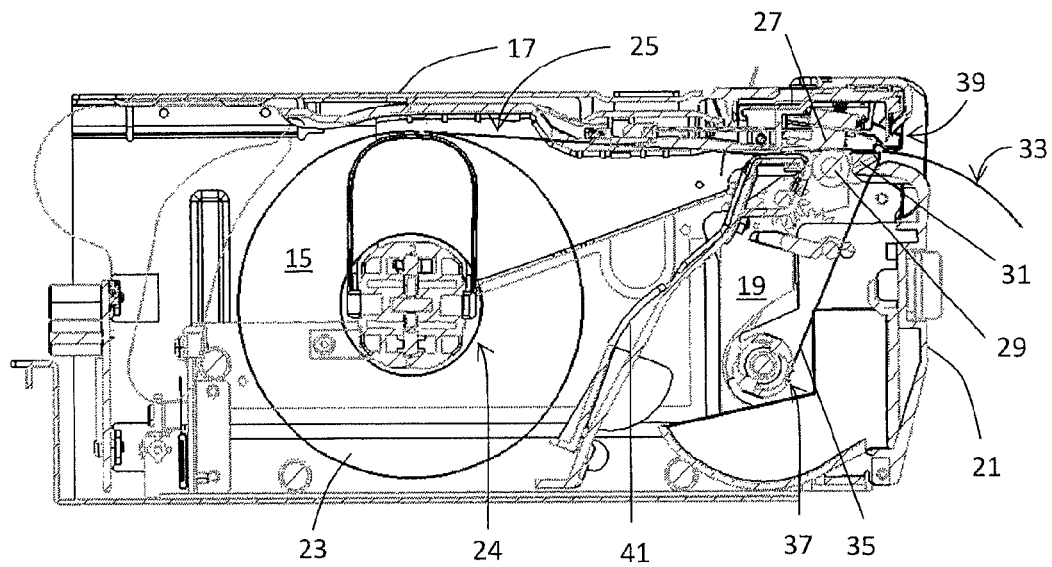
Figure 3:
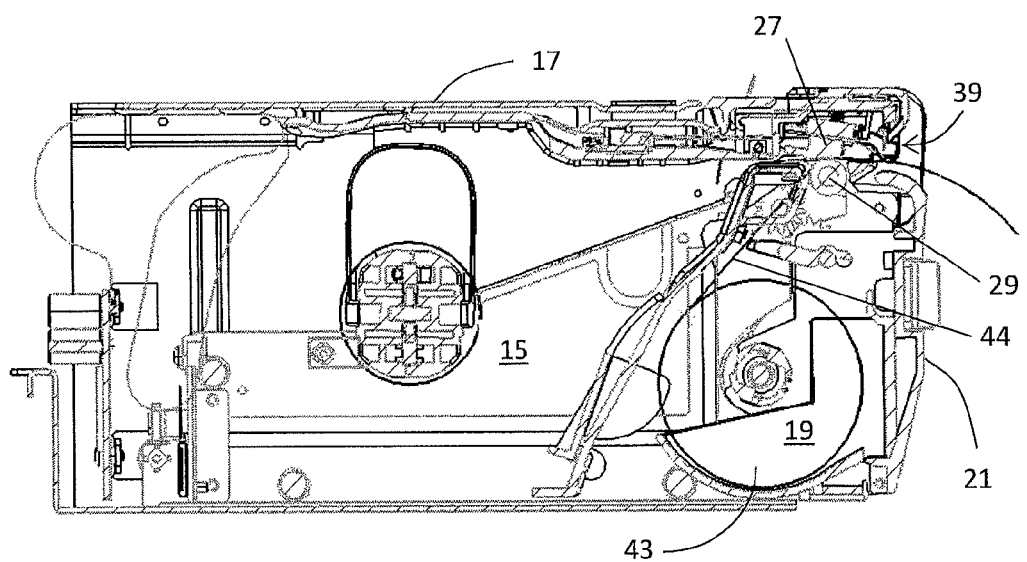
Figure 4:
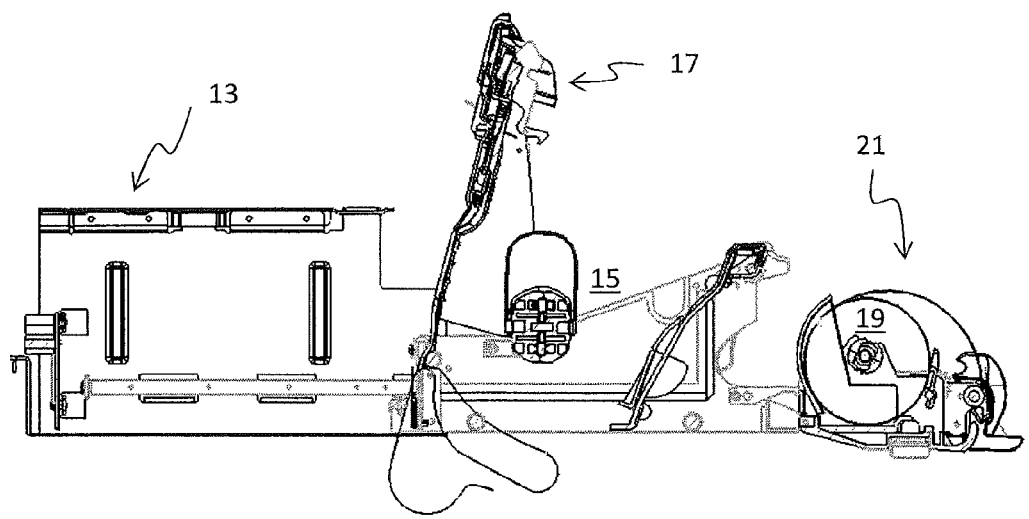
Figure 5:
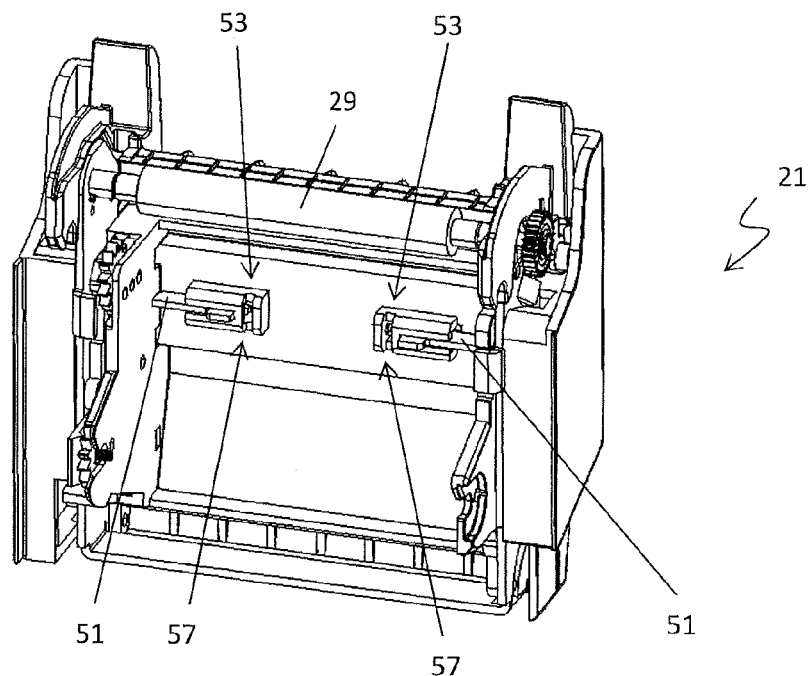

There are shown,

FIG. 1 a perspective frontal view of a label and receipt printer with an open inner flap in accordance with an embodiment of the invention;

FIG. 2 a longitudinal section through the printer in accordance with FIG. 1 with a carrier tape label roll inserted into a first reception space, with an upper-side cover and a front-side cover each being in a closed position;

FIG. 3 a longitudinal section through the printer in accordance with FIG. 1 with a receipt roll inserted into a second reception space, with the upper-side cover and the front-side cover each being in a closed position;

FIG. 4 a longitudinal section through the printer in accordance with FIG. 1 with an open upper-side cover and an open front-side cover;

FIG. 5 a perspective rear view of the front-side cover; and

Figure 6:
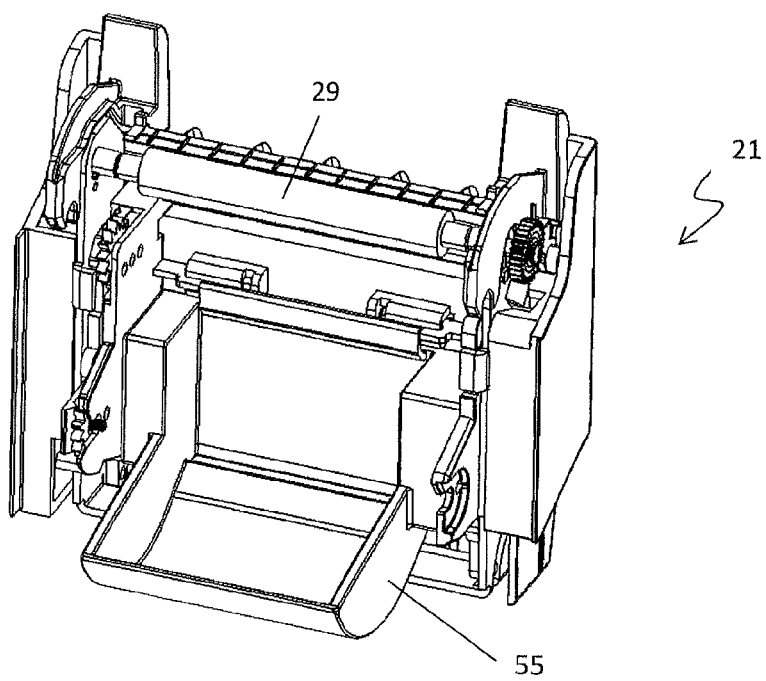

FIG. 6 a perspective rear view of the front-side cover with an inserted receipt roll reception shell.

Store scales are used in supermarkets, for example, to weigh the weight of foods sold at a food counter. Such store scales typically also comprise a printer, in particular a thermal printer, to print a receipt or a label inter alia with the weighed weight, the name of the food and the calculated price.

As can be recognized in FIGS. 1 and 4, the label and receipt printer 11 in accordance with the invention can be arranged to be pulled out in a chassis 13 which is arranged in a correspondingly formed construction space of store scales, not shown, to integrate the printer 11 into the store scales. It is possible by the pulling out to load the printer 11 with a label or receipt roll. The printer 11 loaded in this manner can then again be pushed back into the chassis 13 to start or continue the operation of the store scales in accordance with their intended use.

The printer 11 has two reception spaces for label rolls or receipt rolls (FIGS. 2 to 4). The first reception space 15 is accessible via an upper-side cover 17 which can be pivoted open to the rear; the second reception space 19 is accessible via a front-side cover 21 which can be pivoted open downwardly. A carrier tape label roll, a linerless label roller or a receipt roll can be inserted into the first reception space 15 in an open position of the upper-side cover 17. A receipt roll can be inserted into the second reception space 19 in an open position of the front-side cover 21 or a carrier taper roll can be inserted in an open position of an inner flap, to be explained in more detail in the following, of the end-side cover 21.

The printer 11 is operated with a carrier tape label roll 23 in FIG. 2. For this purpose, a carrier tape label roll 23 is inserted via a roll holder 24 into the first reception space 15. The paper guide or the transport path in this respect takes place such that the medium web 25, i.e. the carrier tape with the labels located thereon, first passes between a thermal printhead 27 and a drive roller 29 configured as a print roll to print the labels. After the drive roller 29, the medium web 25 is deflected downwardly at a removal edge 31, whereby a separation of the labels 33 from the carrier tape 35 is effected. The labels 33 are then dispensed through an outlet opening or dispensing opening in the front-side cover 21 and the carrier tape 35 is wound onto a carrier tape roll 37 inserted into the second reception space 19. The drive roller 29 and the carrier tape roll 37 are driven via a chain wheel drive, not described further, by an electric motor, with the two speeds of rotation being coordinated with one another such that the carrier tape 35 can be wound onto the carrier tape roll 37 under tensile stress. A slip clutch is connected upstream of the carrier tape roll 37 for this purpose.

A linerless label roll can, however, also be inserted into the first reception space 15 instead of the carrier tape label roll 23. Since a linerless label roll does not have any carrier tape, a carrier tape roller is also not necessary. After the printing, individual labels can be torn off by hand from the linerless label web using a tear-off edge 39. In accordance with a further variant, a receipt roller can also be inserted into the first reception space 15. For this purpose, a pivot support 41 present in the first reception space 15 is pivoted—counter-clockwise in FIGS. 2 to 4—downwardly into the horizontal so that the receipt roll can be received in it. The receipts are isolated again after the printing by means of the tear-off edge 39.

In FIG. 3, the printer 11 is operated with a receipt roll 43 which is inserted into the second reception space 19. The paper guide or the transport path in this respect takes place such that the medium web 44, i.e. the receipt paper, runs between the thermal printhead 27 and the drive roller 29 to print the receipt paper. The receipts are then isolated using the tear-off edge 39 such as is also the case with a receipt roll inserted into the first reception space 15. In comparison with a receipt roll inserted into the first reception space 15, the receipt roll 43 inserted into the second reception space 19 can have a different width, in particular a smaller width.

The front-side cover 21 in accordance with FIG. 1 comprises an outer frame 45, which also comprises the drive roller 29, and an inner flap 47, which is pivotably supported within the outer frame 45 relative thereto between an open position and a closed position. The second reception space 19 can likewise be accessed via the inner flap 47. To insert the receipt roller 43 into the second reception space 19, the total front-side cover 21 is pivoted open. In order alternatively to insert the carrier tape roll 37 into the second reception space 19, only the inner flap 47 of the front-side cover 21 is pivoted open.

To be able to pivot the inner flap 47 from its closed position into its open position shown in FIG. 1, a latch of the inner flap 47 must first be released. This takes place by "pressing together" two finger grip sections 49 provided at the outer side of the inner flap 47 using the thumb and index finger. The finger grip sections 49 are fixedly connected to two horizontally extending, bar-shaped pusher sections 51 provided at the inner side of the inner flap 47 (FIG. 5). The two pusher sections 51 are spaced apart from one another in the lateral direction and are preloaded by means of two compression springs into their position respectively latching the inner flap 47. For this purpose, the two pusher sections 51 project in opposite direction respectively laterally outwardly and their ends there engage into corresponding cut-outs in the lateral sides of the outer frame 45. By actuating the finger grip sections 49, the engagement of the two pusher sections 51 into the outer frame 45 against the spring force of the two compression springs 53 is released and the inner flap 47 is thus pivoted downwardly open.

To avoid an operator of the printer 11 or of the store scales accidentally attempting to insert a carrier tape roll into the second reception space 19, although it is already occupied by a receipt roll, a blockage mechanism is provided which prevents the inner flap 47 from being able to be opened in such a case. For this purpose, the printer 11 makes use of a reception shell 55 which is inserted into the second reception space 19 when the printer 11 is to be operated with a receipt roll in the second reception space 19 (FIG. 6).

The reception shell 55 for the receipt roll 43 has at its side facing the front-side end of the printer 11 two webs which are not recognizable in FIG. 6, which extend perpendicular and which engage in the inserted state into two slits 57 which are formed at the inside of the inner flap 47, which intersect the trajectories of the pusher sections 51 and which thus each act as an abutment for the inwardly directed ends of the pusher sections 51 so that a movement of the two pusher sections 51 into their unlatching position, i.e. a pressing together of the two finger grip sections 49, is not possible.

The printhead 27 is provided at the upper-side cover 17 such that—to guide the respective medium web of the medium inserted into the first reception space 15 between the printhead 27 and the drive roller 29—only the upper-side cover 17 has to be pivoted open, the roll start of the respective medium has to be placed over the drive roller 29 and the upper-side cover 17 has to be closed again. A laborious "threading in" is dispensed with. Since the driver roller 29 is pivoted open with the front-side cover 21, this also applies to a receipt roll 43 which is inserted into the second reception space 43 and which automatically clamps a correspondingly sufficiently unwound roller start of the receipt roll 43 between the printhead 27 and the drive roller 29 on the pivoting back of the front-side cover 21 from its open position into the closed position.

As results from the above statements, the printer in accordance with the invention allows a flexible operation with different printed media, in particular linerless labels, carrier tape labels and receipt rolls, and is in this respect comfortable to operate without error.

REFERENCE NUMERAL LIST 11 printer
13 chassis
15 first reception space
17 upper-side cover
19 second reception space
21 front-side cover
23 carrier tape label roll
24 roll holder
25 medium web
27 thermal printhead
29 drive roller
31 removal edge
33 label
35 carrier tape
37 carrier tape roll
39 tear-off edge
41 pivot support
43 receipt roll
44 medium web
45 outer frame
47 inner flap
49 finger grip section
51 pusher section
53 compression spring
55 reception shell
57 slit

The invention claimed is:

1. A printer for printing printed media in the form of label and/or receipt rolls, having
   a printhead and an upper-side cover which is pivotable between a closed position and an open position and which releases access to a reception space for a label or receipt roll in the open position;
   a drive roller which can be driven by a drive of the printer for the transport of the respective printed medium; and
   a front-side cover which can be pivoted between a closed position and an open position and which releases access to a further reception space for a receipt roll in the open position, with the drive roller being provided at the front-side cover and the drive roller configured as a print roll for the printhead.

2. The printer in accordance with claim 1, wherein the front-side cover comprises an outer frame having the drive roller and an inner flap which is pivotable relative to the outer frame between a closed position and an open position and which releases access to the further reception space for a carrier tape roll in the open position.

3. The printer in accordance with claim 2, further comprising a media receiver for a receipt roller which can be inserted into the further reception space with an open front-side cover.

4. The printer in accordance with claim 3, wherein the media receiver is a reception shell.

5. The printer in accordance with claim 3, further comprising blocking means which block the opening of the inner flap with an inserted media receiver.

6. The printer in accordance with claim 5, further comprising a latch which is preloaded into a position latching the opening of the inner flap and which can be moved by means of actuation means into an unlatching position allowing the opening of the inner flap, with the actuation of the latch being blocked with an inserted media receiver.

7. The printer in accordance with claim 6, wherein the latch has two pushers which are each movable in a lateral direction, which are laterally spaced apart from one another, which are preloaded oppositely and respectively laterally and which engage in the latching position with outer ends in lateral sides of the outer frame, with the media receiver having a blockage section for each of the two pushers, with the blockage sections engaging into a respective trajectory of the respective pusher with a media receiver inserted into the further reception space and respectively acting as an abutment for an inner end of the respective pusher blocking the movement of the respective pusher into the unlatching position.

8. The printer in accordance with claim 2, wherein the carrier tape roll inserted into the further reception space is in drive-effective connection with the drive of the printer for driving the driver roller.

9. The printer in accordance with claim 8, wherein a slip clutch is connected upstream of the carrier tape roll.

10. The printer in accordance with claim 1, further comprising a roll holder for carrier tape label rolls and linerless label rolls, the roll holder being able to be inserted into the reception space with an open upper-side cover.

11. The printer in accordance claim 1, wherein a pivot support which can be pivoted into a reception position is provided in the reception space for a receipt roll.

12. The printer in accordance claim 1, wherein the printer provides at least three mutually different paper guides for printed media.

13. The printer in accordance with claim 12, wherein the printer provides four mutually different print guides, for printed media.

14. Store scales having a printer having
a printhead and an upper-side cover which is pivotable between a closed position and an open position and which releases access to a reception space for a label or receipt roll in the open position;
a drive roller which can be driven by a drive of the printer for the transport of the respective printed medium; and
a front-side cover which can be pivoted between a closed position and an open position and which releases access to a further reception space for a receipt roll in the open position, with the drive roller being provided at the front-side cover; wherein the drive roller is configured as a print roll for the printhead.

15. A printer for printing printed media in the form of label and/or receipt rolls, having a printhead and an upper-side cover which is pivotable between a closed position and an open position and which releases access to a reception space for a label or receipt roll in the open position; wherein the printhead is provided at the upper-side cover;
a drive roller which can be driven by a drive of the printer for the transport of the respective printed medium; and
a front-side cover which can be pivoted between a closed position and an open position and which releases access to a further reception space for a receipt roll in the open position, with the drive roller being provided at the front-side cover.

* * * * *